(12) United States Patent
Nishizawa et al.

(10) Patent No.: US 6,620,473 B2
(45) Date of Patent: Sep. 16, 2003

(54) LABEL FOR IN-MOLD DECORATING

(75) Inventors: Takatoshi Nishizawa, Kashima-gun (JP); Masaki Shiina, Kashima-gun (JP); Hironobu Taniguchi, Kashima-gun (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 09/834,968

(22) Filed: Apr. 16, 2001

(65) Prior Publication Data

US 2001/0028952 A1 Oct. 11, 2001

Related U.S. Application Data

(63) Continuation of application No. PCT/JP99/05644, filed on Oct. 13, 1999.

(30) Foreign Application Priority Data

Oct. 15, 1998 (JP) ............................................ 10-293129
Nov. 9, 1998 (JP) ............................................ 10-317422

(51) Int. Cl.[7] ............................ B32B 5/16; B32B 27/30; B32B 27/32; B32B 27/34; B32B 37/36
(52) U.S. Cl. .................... 428/35.7; 428/200; 428/317.3; 428/317.7; 428/323; 428/325; 428/327; 428/328; 428/330; 428/331; 428/336; 428/349; 428/354; 428/355 EN; 428/355 AC; 428/411.1; 428/412; 428/475.8; 428/476.1; 428/476.3; 428/476.9; 428/483; 428/515; 428/522; 428/523; 428/910; 428/914
(58) Field of Search .................... 428/914, 200, 428/206, 336, 323, 325, 327, 328, 330, 331, 349, 355 AC, 355 EN, 476.3, 475.8, 910, 523, 483, 411.1, 515, 522, 500, 354, 355 R, 35.7, 317.3, 317.7, 412, 476.1, 476.9

(56) References Cited

U.S. PATENT DOCUMENTS

| 4,318,950 | A | * | 3/1982 | Takashi et al. | ............. 428/143 |
| 4,758,462 | A | * | 7/1988 | Park et al. | ................... 156/229 |
| 5,049,436 | A | * | 9/1991 | Morgan et al. | ............. 428/213 |
| 5,223,315 | A | * | 6/1993 | Katsura et al. | ........... 428/36.92 |
| 5,662,985 | A | * | 9/1997 | Jensen et al. | ................ 428/195 |
| 6,306,490 | B1 | * | 10/2001 | Biddiscombe | ........... 428/315.5 |

FOREIGN PATENT DOCUMENTS

| JP | 62-164777 | 7/1987 |
| JP | 4-29184 | 1/1992 |
| JP | 5-80702 | 4/1993 |
| JP | 9-221644 | 8/1997 |

OTHER PUBLICATIONS

Hawley's Condensed Chemical Dictionary, 13th Edition, p. 453, Jan. 1999.*
PlasticNet: Overview—Ethylene Vinyl Acetate Copolymer (EVA), Adhesive/Sealant Grade, Jan. 2000.*

* cited by examiner

Primary Examiner—Ramsey Zacharia
(74) Attorney, Agent, or Firm—Oblon, Spivak, McClelland, Maier & Neustadt, P.C.

(57) ABSTRACT

An in-mold decorating label, which comprises a thermoplastic resin film substrate layer (I) having provided on its backside a heat-sealable resin layer (II), the heat-sealable resin layer (II) containing a polyethylenic resin and at least one of (i) a fatty acid amide having a molecular weight of 300 or more and (ii) an organic or inorganic fine powder having an average particle size larger than thickness of the heat-sealable resin layer (II). This label for use in in-mold decorating has excellent feeding and discharging properties upon printing and workability during sheeting, which facilitates insertion of the label into a metal mold during in-mold decorating, and provides a label-laminated container which does not suffer from blister generation and has a large welding force between the container and the label.

17 Claims, 1 Drawing Sheet

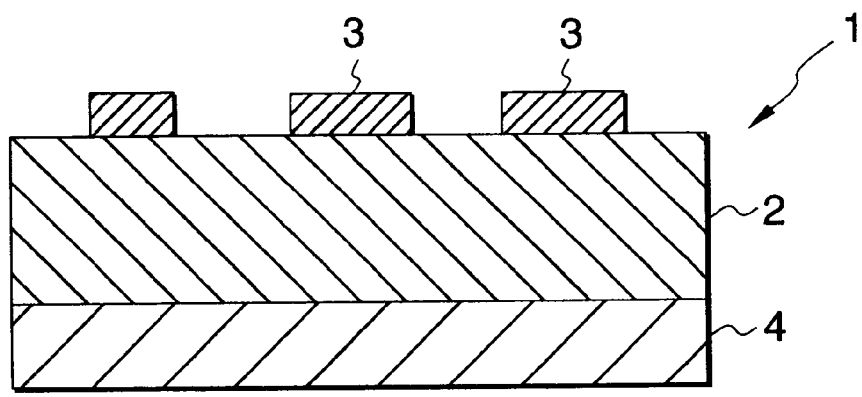
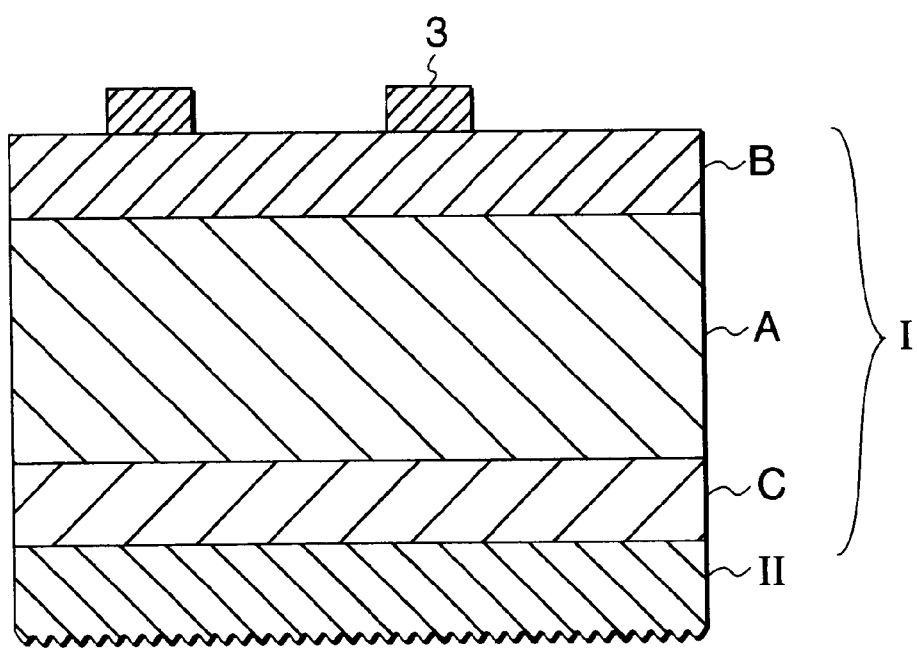

LABEL FOR IN-MOLD DECORATING

This application is a continuation of PCT/JP99/05644 filed on Oct. 13, 1999.

TECHNICAL FIELD

This invention relates to a label for use in in-mold decorating in which the label is set within a metal mold so that the printed surface of the label is in contact with the wall of the mold, and a thermoplastic resin parison is introduced into the mold in a molten state and blow-molded, or a molten thermoplastic resin sheet is vacuum-molded or air-pressure formed to produce a label-laminated container.

BACKGROUND ART

Conventionally, label-laminated resin containers produced by the one-piece molding of a resin have been made by inserting a blank or a label into a metal mold and forming a container within the metal mold by injection molding, blow-molding, differential pressure molding or foam molding (see Japanese Patent Laid-Open No. 69015/1983 and EP-A-254923). Gravure printed resin films or offset multicolor printed synthetic paper (for example, see Japanese Patent Publication No. 7814/1990 and Japanese Patent Laid-Open No. 84319/1990) or aluminum labels having an aluminum foil laminated on its back side in a high pressure process, low density polyethylene or ethylene/vinyl acetate copolymer sheets which are gravure printed on their surface are known as labels for such in-mold decorating.

However, in the process of producing label-laminated containers by in-mold decorating using a label or blank for in-mold decorating, has the problem that, especially in summer, the adhesive ingredients of such labels become so sticky due to the high temperature of summer, that the parting or sliding properties of the paper sheets deteriorates upon printing films or synthetic paper, particularly when using offset sheet printing, resulting in the need to stop and restart the label-producing machine many times.

Furthermore, when carrying out gravure printing or flexographic printing using rolls, the sheets have to be stopped during the sheeting step, after printing, due to the irregular position of the paper caused by the poor sliding properties of the printed paper.

In addition, during transportation of packed printed or blanked labels, the labels are liable to adhere to each other, or cause blocking in the high temperature environment and, upon feeding the labels into a metal mold using an automatic label-feeding apparatus, for example in the in-mold decorating process, two or more labels may be fed at the same time into the metal mold, resulting in production of containers having labels at an undesirable position (defective labels), as well as ineffective utilization of the labels.

An object of the present invention is to provide a label for use in in-mold decorating, which shows excellent blocking resistance even under the high temperature environment of summer, shows good working properties, and to provide a container wherein the label is strongly welded to the container.

DISCLOSURE OF THE INVENTION

The present invention is a label for use in in-mold decorating, which is characterized in that it comprises a thermoplastic, resin film substrate layer (I) which has on its backside a heat-sealable resin layer (II). The resin base material of this heat-sealable resin layer (II) comprises a polyethylenic resin containing least one of (i) a fatty acid amide having a molecular weight of 300 or more and (ii), an organic or inorganic fine powder having an average particle size larger than thickness of the heat-sealable resin layer (II).

By incorporating into the polyethylenic resin of the heat-sealable resin layer (II) at least one of the above-described fatty acid amides and organic or inorganic fine powder, the feeding and discharging properties of the labels after printing, or the arranging properties of the labels upon sheeting are improved, errors upon insertion of the label into the metal mold are decreased, and the welded bonding of the label to a container body after in-mold decorating is strengthened.

BRIEF DESCRIPTION OF THE DRAWING

FIG. 1 is a vertical sectional view of one embodiment of the label of the present invention for use in in-mold decorating.

FIG. 2 is a vertical sectional view of another embodiment of the label of the present invention for use in in-mold decorating.

BEST MODE FOR PRACTICING THE INVENTION (Structure of the Label for Use in In-mold Decorating)

The label of the present invention for use in in-mold decorating is described in more detail below.

FIG. 1 shows the vertical sectional view of a label adapted for blow molding, wherein 1 designates an in-mold decorating label, 2 is a thermoplastic resin film substrate layer (I), 3 is printing, and 4 is a heat-sealable resin layer (II). The heat-sealable resin layer (II) may, if necessary, be embossed on its surface to thereby prevent generation of blisters on the label when bonded to a container (see Japanese Patent Laid-Open No. 84319/1990 and Japanese Patent Laid-Open No. 260689/1991).

FIG. 2 is a diagram showing a partially enlarged vertical section of another embodiment of the label for use in in-mold decorating wherein the thermoplastic resin film substrate layer (I) has a surface layer (B), a core layer (A) and a backing layer (C) and the heat-sealable layer has been embossed.

(Substrate layer (I))

Thermoplastic resins which may be used as materials for the thermoplastic resin substrate layer (I) of the in-mold decorating label may include ethylenic resins such as high density polyethylene or medium density polyethylene resin; polyolefinic resins such as propylenic resins; polymethyl-1-pentene; ethylene/cyclic olefin copolymers; polyamide resins such as nylon-6, nylon-6,6, nylon-6,10, nylon-6,12, nylon-6,T, etc.; thermoplastic polyester resins such as polyethylene terephthalate or its copolymers, polyethylene naphthalate and aliphatic polyesters; and other thermoplastic resins such as polycarbonates, syndiotactic polystyrene and polyphenylene sulfide.

The melting points of the thermoplastic resins may range from 135 to 280° C., and mixtures of two or more of the thermoplastic resins may be used. In addition, the thermoplastic resin used as a main component of the thermoplastic resin film substrate layer (I) has a melting point preferably 15° C. higher than the melting point of the polyethylenic resin comprising the heat-sealable resin layer (II). The thermoplastic resin is preferably a polyolefinic resin. Propylenic resins are the preferred polyolefinic resin in view of their chemical resistance and production cost.

The propylenic resins may be, for example, isotactic, syndiotactic or other various sterically regular propylene homopolymers and copolymers (main component), and the propylene copolymers may include monomers, for example, α-olefins such as ethylene, butene-1, hexene-1, heptene-1 or 4-methylpentene-1. The copolymers may be binary, ternary or quaternary, and may be random copolymers or block copolymers.

When inorganic fine powders are added, the inorganic fine powder may have a particle size of usually 0.01 to 15 μm, preferably 0.01 to 5 μm. Specific examples of inorganic fine powders include, for example, heavy calcium carbonate, light calcium carbonate, calcined clay, silica, diatomaceous earth, talc, titanium oxide, barium sulfate and alumina.

When organic fillers are added, the preferred organic filler is a thermoplastic resin which is different from the thermoplastic resin of the main component. For example, when the thermoplastic resin film is a polyolefinic resin film, the organic fillers may include a polymer such as polyethylene terephthalate, polybutylene terephthalate, polycarbonate, nylon-6, nylon-6,6, nylon-6,T, cyclic olefin, polystyrene or polymethacrylate having a higher melting point (for example, 170 to 300° C.) or a higher glass transition point (for example, 170 to 280° C.) than the melting point of the polyolefinic resin.

When a stabilizing agent is added, the amount of stabilizing agent added may be in the range of usually from 0.001 to 1% by weight In particular, phenolically hindered phenolic, phosphoric or amine type stabilizers may be used.

When a photo-stabilizer is added, the amount of photo-stabilizer may be in the range of usually from 0.001 to 1% by weight. In particular, sterically hindered amine type, benzotriazole type or benzophenone type photo-stabilizers may be used.

A dispersing agent or a lubricant may used, for example for dispersing the inorganic fine powder. The dispersing agent or lubricant may be used in an amount of usually from 0.01 to 4% by weight. In particular, silane coupling agents, higher fatty acids such as oleic acid and stearic acid, metallic soap, polyacrylic acid, polymethacrylic acid, and salts thereof may be used.

The method for molding the thermoplastic resin film is not particularly limited, and may properly be selected from among known molding methods. For example, the film may be formed by a casting method in which a molten resin sheet is extruded using a single- or multi-layer T-die or I-die connected to a screw extruder; the film may be formed by calendering, milling, or by forming a sheet by casting or calendering a mixture of the thermoplastic resin together with an organic solvent or an oil, then removing the solvent or oil.

The thermoplastic resin film support may be a stretched film. Stretching may be conducted by any of the various commonly used processes.

Stretching may be conducted within a temperature range known to be suitable for the thermoplastic resin. That is, for amorphous resins, the stretching process may be carried out at a temperature of not lower than the glass transition point of the thermoplastic resin and, for crystalline resins, the stretching process may be carried out at a temperature of not lower than the glass transition point of amorphous portion of the resin and not higher than the melting point of crystalline portion of the resin. Specifically, the stretching temperature is preferably 2 to 60° C. lower than the melting point of the thermoplastic resin used. If the resin is a propylene homopolymer (m.p. 155 to 167° C.), the stretching temperature is preferably set to 140 to 164° C. If the resin is a high density polyethylene (mp. 121 to 134° C.), the stretching temperature is preferably 110 to 120° C. and, if the resin is a polyethylene terephthalate (mp, 246 to 252° C.), the stretching temperature is preferably 104 to 115° C. The stretching rate is preferably 20 to 350 m/min.

Longitudinal stretching utilizing the peripheral speed difference of a group of rolls, lateral stretching using a tenter oven, or spontaneous biaxial stretching by milling or by a combination of the tenter oven and a linear motor may be employed as the stretching method.

The stretching ratio is not particularly limited, and may properly be determined by considering the thermoplastic resin to be used. For example, when the thermoplastic resin is a propylene homopolymer or copolymer, it may be stretched about 1.2 to 12-fold, preferably 2 to 10-fold, with respect to uniaxial stretching, or 1.5 to 60-fold in terms of the ratio of the area of the film after and before stretching, preferably 10 to 50-fold with respect to biaxial stretching. When other thermoplastic resins are used, the stretching ratio may be 1.2 to 10-fold, preferably 2 to 5-fold, with respect to uniaxial stretching, or 1.5 to 20-fold in terms of area ratio, preferably 4 to 12-fold, with respect to biaxial stretching.

In view of the printability, label-feeding properties into a metal mold, and heat shrinking resistance, the preferred substrate layer (I) is a finely porous resin stretched film (see FIG. 2) comprising a biaxially stretched film core layer (A) comprising a resin composition containing 5 to 30% by weight of an inorganic fine powder, 3 to 20% by weight of a high density polyethylene and 92 to 50% by weight of a propylenic resin, and having laminated on one side thereof a uniaxially stretched film surface layer (B) comprising a resin composition containing 35 to 65% by weight of an inorganic fine powder, 0 to 10% by weight of a high density polyethylene and 55 to 35% by weight of a propylenic resin and having laminated on the opposite side of the core layer (A) a backing layer (C) comprising a uniaxially stretched film of a resin composition containing 35 to 65% by weight of an inorganic fine powder, 0 to 10% by weight of a high density polyethylene and 55 to 35% by weight of a propylenic resin.

In addition, in order to adjust the density of the substrate layer (I), a substrate layer film in which a layer for adjusting the density is provided between the core layer (A) and the surface layer (B), is also preferred.

Such a film may be exemplified by a finely porous, stretched resin film which comprises a biaxially stretched film core layer (A) of a resin composition containing 5 to 30% by weight of an inorganic fine powder, 3 to 20% by weight of a high density polyethylene and 92 to 50% by weight of a propylenic resin, and having laminated on one side thereof a backing layer (C) composed of a uniaxially stretched film of a resin composition containing 35 to 65% by weight of an inorganic fine powder, 0 to 10% by weight of a high density polyethylene and 55 to 35% by weight of a propylenic resin, and having laminated on the opposite side of the core layer (A) an intermediate layer (D) of a uniaxially stretched film of a resin composition containing 35 to 65% by weight of an inorganic fine powder, 0 to 10% by weight of a high density polyethylene and 55 to 35% by weight of a propylenic resin, and a surface layer (B) comprising a uniaxially stretched film of a resin composition containing 35 to 65% by weight of an inorganic fine powder, 0 to 10% by weight of a high density polyethylene and 55 to 35% by weight of a propylenic resin, with the content of the organic fine powder being different from that of the intermediate layer (D). In this finely porous resin stretched film (I), printing is provided on the side of the surface layer (B), and the heat-sealable resin layer (II) is provided on the side of the backing layer (C).

Furthermore, when the printing system is gravure printing, letter press printing or flexographic printing, a substrate film which comprises a finely porous biaxially stretched film substrate layer (I) of a resin composition containing 5 to 30% by weight of an inorganic or organic fine powder, 3 to 20% by weight of a high density polyethylene and 92 to 50% by weight of a propylenic resin, and having laminated on one side thereof a heat-sealable resin layer (II), may also be used.

These finely porous resin stretched films have a void volume of 5 to 60%, preferably 8 to 50%, more preferably 8 to 40%, said void volume calculated by the following formula. When the void volume is less than 5%, reducing the weight of the film is difficult whereas, when it is more than 60%, the film tends to cause problems with respect to label strength.

$$\text{Void Volume } (\%) = \frac{\rho_0 - \rho}{\rho_0} \times 100$$

$\rho_0$: density of non-stretched resin film
$\rho$: density of stretched film

The finely porous resin stretched films have a void volume of from 0.65 to 1.02 g/cm².

The thickness of the substrate layer (I) is in the range of 20 to 200 μm, preferably 40 to 150 μm.

(Heat-sealable resin layer (II)):
(1) Constituents
(i). Polyethylenic resin

The polyethylenic resin of component (i) may be a low density to medium density high pressure process polyethylene having a density of 0.900 to 0.935 g/cm³, a straight-chain linear polyethylene having a density of 0.880 to 0.940 g/cm³, and polyethylenic resins having a melting point of 80 to 130° C. such as ethylene/vinyl acetate copolymers, ethylene/acrylic acid copolymers, ethylene/alkyl acrylate copolymers, ethylene/alkyl methacrylate copolymers (in which the carbon number of the alkyl group is 1 to 8) and metal salts (Zn, Al, Li, K, Na, etc.) of ethylene/methacrylic acid copolymers.

A high pressure process polyethylene having a crystallinity (X-ray method) of 10 to 60% and a number average molecular weight of 10,000 to 40,000, or a straight-chain linear polyethylene is preferred. In view of the adhesion properties for container applications, a straight-chain linear polyethylene which is obtained by copolymerizing 40 to 98% by weight of ethylene and 60 to 2% by weight of an α-olefin containing 3 to 30 carbon atoms using a metallocene catalyst, especially a metallocene-alumoxane catalyst, or a catalyst composed of a metallocene compound and a compound capable of reacting with a metallocene compound to form a stable anion, is especially optimal. These polyethylenic resins may be used independently or as a mixture of two or more polyethylenic resins.

The melting point of the polyethylenic resin is preferably lower than the melting point of the thermoplastic resin used in the aforementioned substrate layer (I) by 15° C. or more, preferably 15 to 90° C. When this difference in the melting point is less than 15° C., both the surface and the backside of the sheet are liable to adhere to each other when the sheet is wound up into rolls during the production process, and therefore the workability is poor.

(ii) Fatty acid amides

The fatty acid amide which may be compounded into the resin component, may be a particular fatty acid amide shown below, and may be used alone or as a mixture obtained by mixing two or more fatty acid amides, and kneading the mixture in an extruder or a kneader.

The fatty acid amide used in the present invention may be fatty acid amides, unsaturated fatty acid amides, saturated fatty acid substituted amides, unsaturated fatty acid substituted amides, saturated fatty acid bisamides and unsaturated fatty acid bisamides, which have a molecular weight of 300 or more, preferably 300 to 1000. When the molecular weight is less than 300, such fatty acid amides exude from the film surface upon heating and stretching during the process of producing the in-mold decorating label, and thus the intended sliding properties and anti-blocking properties are not obtained. On the other hand, when the molecular weight exceeds 1000, such fatty acid amides do not bleed out onto the surface, and thus fail to provide the intended sliding properties. In addition, the melting point of such fatty acids is preferably in the range of 60 to 160° C. When the melting point is lower than 60° C., such fatty acid amides are released from the film surface upon heating and stretching during the process of producing the in-mold decorating label, and thus the intended sliding properties and anti-blocking properties are not obtained. On the other hand, when the melting point exceeds 160° C., such fatty acid amides do not bleed out onto the surface, thus failing to provide the intended sliding properties.

Examples of such fatty acid amides may include behenic acid amide, methylenebisstearic acid amide, ethylenebis lauric acid amide, ethylenebisstearic acid amide, ethylenebisoleic acid amide, ethylenebisercinic acid amide and N-stearylercamide, N-stearyloleylamide.

These fatty acid amides are compounded in the resin used to form the heat-sealable resin layer, in an amount of preferably 0.05 to 10% by weight, more preferably, 0.1 to 5% by weight.

When the content of the amide is too small, the intended sliding properties or anti-blocking properties are insufficient, and when the content of the amide is too large, blistering and decreased adhesion strength to the bottle is liable to take place upon in-mold decorating, and thus the in-mold decorating products obtained are commercially valueless.

(iii) Fine powder

The fine powder which may be compounded into the resin component may be the organic or inorganic fine powders described below, and may be used alone or as a mixture obtained by mixing two or more of these powders and kneading the mixture in an extruder or a kneader.

(a) Organic fine powder

The organic fine powder which may be compounded into the polyethylenic resin may be, for example, polymethyl methacrylate fine particles, crosslinked polymethyl methacrylate fine particles, crosslinked polystyrene fine particles, silicone resin fine particles and polytetrafluoroethylene fine particles. Crosslinked polymethyl methacrylate fine particles and silicone resin fine particles are preferred in view of their kneading properties with the polyethylenic resin and heat resistance.

(b) Inorganic fine powder

The inorganic fine powder which may be compounded into the polyethylenic resin may be, for example, heavy calcium carbonate, light calcium carbonate, clay, aluminosilicate, sodium calcium aluminosilicate, silica, soda-lime glass, talc, titanium oxide and barium sulfate. Spherical or approximately cubic powder particles having a small aspect ratio of filler particle size or particles with a narrow particle size distribution are preferred, since they can provide large effects even when used in a small amount, and so do not tend to inhibit the heat-sealing properties of the polyethylenic resin.

(iv) Optional components

Other known additives may optionally be added to the heat-sealable resin layer (II) of the present invention, in an amount which does not damage the required properties of the heat-sealable resin layer. Such additives may be, for example, dyes, nucleating agents, plasticizers, parting agents, antioxidants, fire retardants and UV ray absorbing agents.

(2) Thickness

The thickness of the heat-sealable resin layer (II) may be in the range of preferably 1 to 10 μm, more preferably 2 to 8 μm.

This thickness is required to be 1 μm or more since the film of the heat-sealable resin layer (II) melts upon blow molding, due to the heat of the molten polyethylene or polypropylene of the parison, and the molded container and the label are liable to strongly weld to each other. When the thickness exceeds 10 μm, the label is liable to curl, which makes it difficult to conduct offset printing or to fix the label to a metal mold, and thus, such a thickness is not preferred.

These factors of thickness of the heat-sealable resin layer (II), particle size, and content of the fine powder, are of importance in obtaining the intended label. That is, if the particle size of the fine powder is smaller than the thickness of the heat-sealable resin layer, the fine powder is buried within the layer and is not exposed on the surface, and thus the intended sliding properties or anti-blocking properties are not obtained. For this purpose, the average particle size of the fine powder is required to be more than at least the thickness of the heat-sealable resin layer.

In addition, although the particle size of the fine powder is not particularly limited with regard to its upper limit, fine powders having an average particle size of 20 μm or less, preferably 15 μm or less, are preferred. When the particle size exceeds 20 μm, the fine powder becomes likely to drop out of the heat-sealable layer as isolated particles or as an agglomerate thereof, thereby detrimentally affecting the appearance of the printed labels.

The organic or inorganic fine powder having an average particle size greater than thickness of the heat-sealable resin layer is present in an amount of 0.03 to 15% by weight, preferably 0.05 to 10% by weight. If the amount of organic or inorganic fine powder is too small, the intended sliding properties or anti-blocking properties are not obtained, and if the amount is too large, the powder detrimentally affects heat welding of the label. Thus, in order to properly balance the heat welding properties of the label and the sliding or anti-blocking properties of the label, fine powders having a narrow particle size distribution are more preferred.

As described above, the heat-sealable resin layer of the label may be subjected to embossing so as to prevent generation of blisters upon blow molding, as described in Japanese Patent Laid-Open No. 84319/1990 and Japanese Patent Laid-Open No. 260689/1991.

The embossing pattern is, for example, 5- to 25-line embossing per 2.54 cm, with the valley depth of the embossing being 1 to 8 μm (micron) and ⅓ or more of the thickness of the heat-sealable resin layer. Embossing is not necessary for labels for injection molding.

These in-mold decorating labels may, if necessary, be subjected to corona discharge processing to improve the printability of the surface of substrate layer (I).

The labels may be printed by gravure printing, offset printing, flexographic printing or screen printing, and the labels may be printed with a bar code, a name of maker, a name of selling company, a character, a name of product or a method of use.

The thus printed label (1) is separated by punching into labels of the necessary form and dimension. This in-mold decorating label may be in the form of a label partly applied to the surface of a container, but commonly it is produced as a blank surrounding the side wall of a cup-shaped container, or as a label to be applied to the surface and/or backside of a bottle-shaped container formed by blow molding.

(In-mold decorating)

The in-mold decorating label is placed within the cavity of a lower female metal mold for differential pressure molding, with the printed side being in contact with the cavity surface of the metal mold, then fixed to the inside wall of the metal mold by vacuumizing the metal mold. Subsequently, a melt of the container-forming material resin is introduced into the upper portion of the lower female metal mold, and differential pressure-molded in a conventional manner, thereby providing a label-laminated container in which the label is welded in one piece to the outer wall of the container.

Either of vacuum molding and air-pressure forming may be employed as the differential pressure molding process, but in general, differential pressure molding using both molding methods and using a plug assist may be used. This label may also be used in blow molding processes wherein a molten resin parison is pressed against the inside wall of a metal mold by pressurized air.

Since the labeled container as described above is produced by fixing a label (1) within a metal mold and then one-piece molded with the label on a resin container, the label (1) is not deformed, adhesion strength between the container body and the label (1) is strong, no blister is formed, and appearance of the container decorated with the label is good.

The invention is more specifically described by reference to the Examples and Comparative Examples.

[I] Methods of measuring physical properties and methods of their evaluation (1) Measurement and evaluation of physical properties in the Examples and Comparative Examples were carried out in the following manner.

(a) MFR: measured according to JIS-K-7210

(b) Density: measured according to JIS-K-7112

(c) Friction coefficient: Friction coefficients (static friction coefficient and dynamic friction coefficient) between the surface layer (B) before being printed and the heat-sealable resin layer (II) were measured according to JIS-K-7125.

(2) In-mold decorating (d) Suitability of the label for insertion into a metal mold Labels punched into a dimension of 60 mm laterally and 110 mm longitudinally were set in a label magazine, and 100 labels were continuously fed into a split blow molding mold using an automatic label-feeding apparatus made by Penteru K.K. Feeding errors (feeding two labels at the same time; dropping a label from the metal mold; or a label being welded at a position different from the desired position) upon molding were counted.

O: No errors were observed.

Δ: 1 to 5 errors were observed.

X: 6 or more errors were observed.

(e) Welded strength of the label to the container

The label welded to the container was cut out and had a width of 15 mm, and the adhesion strength between the label and the container was determined by T-delaminating at a pulling rate of 300 mm/min using an Autograph Model AGS-D tensile machine made by Shimazu Seisakusho K.K.

The standard for evaluating the usability of the label is as follows.

400 g/15 mm or more: practically no problems 200 to 400 g/15 mm: practically no problems though adhesion is somewhat weak 200 g/15 mm or less: practically problematical (3) Feedability in offset printing 1000 labels having a size of 636 mm×470 mm were continuously printed at a rate of 7000 labels/hour using a Model DAIYA-II printing machine made by Mitsubishi Heavy Industries, Ltd. The number of times the machine was stopped due to problems (two labels being fed at the same time or the label getting out of position) in the sheet-feeding apparatus was counted and scored according to the following standard.

O: The machine was not stopped at all.

Δ: The machine was stopped 1 to 3 times.

X: The machine was stopped 4 times or more.

Examples of Producing Labels

Example 1

(1) A resin composition (A) composed of 67 parts by weight of Novatec PP, MA-8 propylene homopolymer (trade name; mp: 164° C.) manufactured by Japan Polychem Corporation, 10 parts by weight of Novatec HD, HJ580 high density polyethylene (trade name; mp:134° C.; density: 0.960 g/cm$^3$) manufactured by Japan Polychem Corporation and 23 parts by weight of calcium carbonate powder having a particle size of 1.5 μm was melted and kneaded in an extruder, then extruded through a die at a temperature of 250° C. in the form of a sheet, then cooled to a temperature of about 50° C.

The resulting sheet was then heated to about 153° C., and stretched 4-fold in the longitudinal direction utilizing the peripheral speed of the rolls, to obtain a uniaxially stretched film.

(2) Separately, a resin composition (B) composed of 51.5 parts by weight of Novatec PP, MA-3 propylene homopolymer (trade name; mp: 165° C.) manufactured by Japan Polychem Corporation, 3.5 parts by weight of HJ580 high density polyethylene having a density of 0.950 g/cm$^3$), 42 parts by weight of calcium carbonate powder having a particle size of 1.5 μm and 3 parts by weight of titanium oxide powder having a particle size of 0.8 μm was melted and kneaded at 240° C. in a different extruder, then extruded through a die in the form of a film onto the aforementioned longitudinally stretched film surface, to form a laminate (B/A), thereby providing a surface layer/core layer laminate.

(3) 80 parts by weight of an ethylene/1-hexene copolymer (content of 1-hexene: 22% by weight; crystallinity: 30%; number average molecular weight: 23,000; mp: 90° C.) having an MFR of 18 g/10 and a density of 0.898 g/cm$^3$ obtained by copolymerizing ethylene and 1-hexene using a metallocene catalyst, 19 parts by weight of a high pressure process low density polyethylene having a MFR of 4 g/10 min and a density of 0.92 g/cm$^3$ and 1 part by weight of ethylenebisoleic acid amide were melted and kneaded at 200° C. in a biaxial extruder, then extruded through a die in the form of a strand, then cut to obtain pellets (II) for the heat-sealable resin layer.

(4) A composition (C) composed of 51.5 parts by weight of MA-3 propylene homopolymer 3.5 parts by weight of HJ580 high density polyethylene, 42 parts by weight of calcium carbonate having a particle size of 1.5 μm, and 3 parts by weight of titanium oxide powder having a particle size of 0.8 μm, and the aforementioned pellets (II) for the heat-sealable resin layer, were separately melted and kneaded at 230° C. in different extruders, respectively, then fed to one co-extruding die and, after lamination in the die, the laminate was extruded through the die in the form of a film at 230° C., and extruded on the layer A side of the aforesaid surface layer/core layer laminate (B/A), with the heat-sealable resin layer (II) being outside, thereby providing a laminate.

This 4-layered film (B/A/C/II) was introduced into a tenter oven and, after being heated to 155° C., stretched 7-fold in the lateral direction, then heat-set at 164° C. Furthermore, the surface layer (layer B) was subjected to corona discharge treatment at 70 W/m$^2$/min, cooled to 55° C., and trimmed to obtain a finely porous resin stretched film with a 4-layered structure (B/A/C/II) having a density of 0.790 g/cm$^3$ and a thickness of 100 μm.

The surface layer (B) side of the laminated stretched resin film having the 4-layered structure was offset printed in an environment having a temperature of 27° C. and a relative humidity of 60%. The thus obtained label papers for use in in-mold decorating showed good releasing or sliding properties, generated less static electricity, and never caused stopping problems during printing.

The labels were then cut and punched to obtain labels (1) for use in in-mold decorating (60 mm in length laterally and 110 mm in length longitudinally).

100 sheets of the labels (1) were piled up in an environment having a temperature of 30° C. and a relative humidity of 50% and, after being fixed to one of the blow molding split molds using an automatic label-feeding apparatus and utilizing vacuum with the printed side in contact with the mold, a parison of high density polyethylene (mp: 134° C.) was melt-extruded at 200° C. into the mold, followed by closing the split molds and feeding a 4.2 kg/cm$^2$ pressurized air into the parison to expand it in the molds to thereby form a container with the in-mold decorating label simultaneously welded to the container. Then, after cooling the molds, they were opened, and a hollow container onto which the label was welded was taken out. The suitability of the label for insertion into the metal mold, the occurrence of blisters, and the adhesion strength of the label are shown in Table 1.

This labeled hollow container did not suffer fading of the printing and mis-positioning of the label and suffered no blistering. The welding strength between the container and the label was 590 g/15 mm width. The results of the evaluation of this sample are shown in Table 1.

Example 2

(1) A resin composition (A) composed of 67 parts by weight of Novatec PP, MA-8 propylene homopolymer of (trade name; mp: 164° C.) manufactured by Japan Polychem Corporation, 10 parts by weight of Novatec HD, HJ580 high density polyethylene (trade name; mp:134° C.; density: 0.960 g/cm$^3$) manufactured by Japan Polychem Corporation and 23 parts by weight of calcium carbonate powder having a particle size of 1.5 μm was melted and kneaded in an extruder, then extruded through a die at a temperature of 250° C. in the form of a sheet, then cooled to a temperature of about 50° C.

This sheet was then heated to about 153° C., and stretched 4-fold in the longitudinal direction utilizing the peripheral speed of the rolls to provide a uniaxially stretched film.

(2) The heat-sealable resin pellets obtained in the aforementioned step (3) were melted and kneaded at 200° C. in an extruder, and extruded through the die onto one side of the uniaxially stretched film to form a laminate (A/II).

(3) This 2-layered film (A/II) was introduced into a tenter oven and, after being heated to 153° C., stretched 7-fold in the lateral direction using the tenter, then heat-set at 160° C. Furthermore, the printable layer (layer A) was subjected to corona discharge treatment at 70 W/m²/min, cooled to 55° C., and trimmed to obtain a finely porous resin stretched film with a 2-layered structure (A/II) having a density of 0.720 g/cm³ and a thickness of 100 μm (A/II=95/5 μm). The results of evaluating this sample are tabulated in Table 1.

Examples 3 to 8

Comparative Examples 1 to 4

In-mold decorating labels were obtained in the same manner as in Example 1 except for changing the formulation of the heat-sealable resin layer (II) as shown in Table 1. The results of the evaluation of the samples are tabulated in Table 1.

TABLE 1

| Composition of heat sealable resin layer (II) | M.W. of Fatty acid amide | mp of Fatty acid amide (° C.) | Ex. 1 | Ex. 2 | Ex. 3 | Ex. 4 | Ex. 5 | Ex. 6 |
|---|---|---|---|---|---|---|---|---|
| Ethylene/hexene-1 copolymer (mp 90° C.) | — | — | 80 | 80 | 80 | — | 80 | 80 |
| High pressure process low density polyethylene (mp 110° C.) | — | — | 19 | 19 | 17 | 27 | 19 | 19 |
| Ethylene/methyl acrylate copolymer (mp 80° C.) | — | — | — | — | — | 70 | — | — |
| Ethylenebisoleic acid amide | 588 | 120 | 1 | 1 | 3 | 3 | — | — |
| Ethylenebisstearic acid amide | 592 | 133 | — | — | — | — | 1 | — |
| Ethylenebiserucic acid amide | 700 | 131 | — | — | — | — | — | 1 |
| N-Stearylerucic amide | 589 | 75 | — | — | — | — | — | — |
| Behenic acid amide | 339 | 110 | — | — | — | — | — | — |
| Lauric acid amide | 199 | 85 | — | — | — | — | — | — |
| Oleic acid amide | 281 | 75 | — | — | — | — | — | — |
| Thickness of heat-sealable resin layer (II) (μm) | | | 5 | 5 | 5 | 5 | 5 | 5 |
| Evaluation: Static friction coefficient | | | 0.53 | 0.55 | 0.49 | 0.57 | 0.51 | 0.52 |
| Dynamic friction coefficient | | | 0.41 | 0.43 | 0.35 | 0.42 | 0.40 | 0.41 |
| Feeding properties upon printing | | | ○ | ○ | ○ | ○ | ○ | ○ |
| Label-inserting suitability | | | ○ | ○ | ○ | ○ | ○ | ○ |
| Generation of blister | | | none | none | none | none | none | none |
| Adhesion strength with container (g/15 mm) | | | 590 | 570 | 280 | 450 | 610 | 580 |

| Composition of heat sealable resin layer (II) | M.W. of Fatty acid amide | mp of Fatty acid amide (° C.) | Ex. 7 | Ex. 8 | Comp. Ex. 1 | Comp. Ex. 2 | Comp. Ex. 3 | Comp. Ex. 4 |
|---|---|---|---|---|---|---|---|---|
| Ethylene/hexene-1 copolymer (mp 90° C.) | — | — | 80 | 80 | 80 | 80 | 80 | 80 |
| High pressure process low density polyethylene (mp 110° C.) | — | — | 19 | 19 | 19.8 | 5 | 19 | 19 |
| Ethylene/methyl acrylate copolymer (mp 80° C.) | — | — | — | — | — | — | — | — |
| Ethylenebisoleic acid amide | 588 | 120 | — | — | 0.03 | 15 | — | — |
| Ethylenebisstearic acid amide | 592 | 133 | — | — | — | — | — | — |
| Ethylenebiserucic acid amide | 700 | 131 | — | — | — | — | — | — |
| N-Stearylerucic amide | 589 | 75 | — | 1 | — | — | — | — |
| Behenic acid amide | 339 | 110 | 1 | — | — | — | — | — |
| Lauric acid amide | 199 | 85 | — | — | — | — | 1 | — |
| Oleic acid amide | 281 | 75 | — | — | — | — | — | 1 |
| Thickness of heat-sealable resin layer (II) (μm) | | | 5 | 5 | 5 | 5 | 5 | 5 |
| Evaluation: Static friction coefficient | | | 0.57 | 0.55 | 0.66 | 0.40 | 0.62 | 0.64 |
| Dynamic friction coefficient | | | 0.43 | 0.42 | 0.61 | 0.27 | 0.54 | 0.57 |
| Feeding properties upon printing | | | ○ | ○ | Δ | ○ | ○ | Δ |
| Label-inserting suitability | | | ○ | ○ | Δ | ○ | Δ | Δ |

TABLE 1-continued

| | | | | | | |
|---|---|---|---|---|---|---|
| Generation of blister | none | none | none | yes | none | none |
| Adhesion strength with container (g/15 mm) | 420 | 600 | 790 | 140 | 310 | 270 |

Example 9

(1) A resin composition (A) composed of 67 parts by weight of Novatec PP, MA-8 propylene homopolymer (trade name; mp: 164° C.) manufactured by Japan Polychem Corporation, 10 parts by weight of Novatec HD, HJ580 high density polyethylene (trade name; mp:134° C.; density: 0.960 g/cm$^2$) manufactured by Japan Polychem Corporation and 23 parts by weight of calcium carbonate powder having a particle size of 1.5 µm was melted and kneaded in an extruder, then extruded through a die at a temperature of 250° C. in the form of a sheet, then cooled to a temperature of about 50° C.

This sheet was then heated to about 153° C., and stretched 4-fold in the longitudinal direction utilizing the peripheral speed of the rolls to provide a uniaxially stretched film.

(2) Separately, a resin composition (B) composed of 51.5 parts by weight of Novatec PP, MA-3 propylene homopolymer (trade name; mp: 165° C.) manufactured by Japan Polychem Corporation, 3.5 parts by weight of HJ580 high density polyethylene having a density of 0.950 g/cm$^3$), 42 parts by weight of calcium carbonate powder having a particle size of 1.5 µm and 3 parts by weight of titanium oxide powder having a particle size of 0.8 µm was melted and kneaded at 240° C. in a different extruder, then extruded through a die onto the aforementioned longitudinally stretched film surface to form a laminate (B/A), thereby providing a surface layer/core layer laminate.

(3) 80 parts by weight of an ethylene/1-hexene copolymer (content of 1-hexene: 22% by weight; crystallinity: 30%; number average molecular weight: 23,000; mp: 90° C.) having an MFR of 18 g/10 min and a density of 0.898 g/cm$^3$ obtained by copolymerizing ethylene and 1-hexene using a metallocene catalyst, 19 parts by weight of high pressure process low density polyethylene having an MFR of 4 g/10 min and a density of 0.92 g/cm$^3$ and 1 part by weight of Epostar MA1010 crosslinked polymethyl methacrylate fine particles (average particle size: 10 µm) made by Nihon Shokubai K.K. were melted and kneaded at 200° C. in a biaxial extruder, then extruded through a die in the form of a strand, then cut to obtain pellets (II) for the heat-sealable resin layer.

(4) A composition (C) composed of 51.5 parts by weight of MA-3 propylene homopolymer, 3.5 parts by weight of HJ580 high density polyethylene, 42 parts by weight of calcium carbonate having a particle size of 1.5 µm and 3 parts by weight of titanium oxide powder having a particle size of 0.8 µm and the aforementioned pellets (II) for the heat-sealable resin layer, were separately melted and kneaded at 230° C. in different extruders, respectively, then fed into one co-extruding die and, after lamination in the die, the laminate was extruded through the die in the form of a film at 230° C., and extruded on the layer A side of the aforementioned surface layer/core layer laminate (B/A) with the heat-sealable resin layer (II) being outside, thereby providing a laminate.

This 4-layered film (B/A/C/II) was introduced into a tenter oven and, after being heated to 155° C., stretched 7-fold in the lateral direction, then heat-set at 164 C. Furthermore, the surface layer (layer B) was subjected to corona discharge treatment of 70 W/m$^2$/min, cooled to 55° C., and trimmed to obtain a finely porous resin stretched film with a 4-layered structure (B/A/C/II=30/40/25/5 µm) having a density of 0.790 g/cm$^3$ and a thickness of 100 µm.

The surface layer (B) side of the laminated stretched resin film having the 4-layered structure was offset printed in an environment having a temperature of 27° C. and a relative humidity of 60%. The thus obtained in-mold decorating label papers showed good releasing or sliding properties, generated less static electricity, permitted smooth feeding and discharging of papers and never caused stopping problems during printing.

The labels were then cut and punched to obtain labels (1) for use in in-mold decorating (60 mm in length laterally and 110 mm in length longitudinally).

100 sheets of the labels (1) were piled up in an environment having a temperature of 30° C. and a relative humidity of 50% and, after being fixed to one of the blow molding split molds using an automatic label-feeding apparatus and utilizing vacuum with the printed side in contact with the mold, a parison of high density polyethylene (mp: 134° C.) was melt-extruded at 200° C. into the mold, followed by closing the split molds and feeding 4.2 kg/cm$^2$ pressurized air into the parison to expand it to the molds and thereby form a container with the in-mold decorating label simultaneously fused to the container. Then, after cooling the molds, they were opened, and a hollow container on which the label was fused was taken out. The suitability of the label for insertion into the metal mold, the occurrence of blisters, and the adhesion strength of the label are shown in Table 2.

This labeled hollow container did not suffer fading of the printing and mis-positioning of the label, and suffered no blisters. The fusion strength between the container and the label was 740 g/15 mm width. The results of the evaluation of this sample are shown in Table 2.

Example 10

Comparative Examples 5 and 6

In-mold decorating labels were obtained in the same manner as in Example 9 except for changing the amounts of the high pressure process low density polyethylene and Epostar MA1010 in the heat-sealable resin layer as shown in Table 2. The results of evaluating the samples are tabulated in Table 2.

Example 11

In-mold decorating labels were obtained in the same manner as in Example 9 except for changing the composition of the polyethylenic resin composition in the heat-sealable resin layer (II) as shown in Table 2. The results of evaluating the samples are tabulated in Table 2.

Example 12

In-mold decorating labels were obtained in the same manner as in Example 9 except for using crosslinked polymethyl methacrylate fine particles of Epostar MA 1013 (average particle Size; 13 µm) made by Nippon Shokubai Co., Ltd. as the organic fine powder in the heat-sealable resin layer (II). The results of evaluating the sample are tabulated in Table 2.

Example 13

In-mold decorating labels were obtained in the same manner as in Example 9 except for using crosslinked polymethyl methacrylate fine particles of Art Pearl G400 (average particle size: 10 μm) made by Negami Chemical Industrial Co. Ltd. as the organic fine powder in the heat-sealable resin layer (II). The results of evaluating the sample are tabulated in Table 2.

Example 14

In-mold decorating labels were obtained in the same manner as in Example 9 except for using silicone resin particles of Tospearl 3120 (average particle size: 12 μm) made by Toshiba Silicone K.K. as the organic fine powder in the heat-sealable resin layer (II). Results of evaluating the sample are tabulated in Table 2.

Example 15

In-mold decorating labels were obtained in the same manner as in Example 9 except for using crosslinked polymethyl methacrylate particles of MX-1000 (average particle size: 10 μm) made by Soken Chemical & Engineering Co., Ltd. as the organic fine powder in the heat-sealable resin layer (II). The results of evaluating the sample are tabulated in Table 2.

Comparative Example 7

In-mold decorating labels were obtained in the same manner as in Example 9 except for using crosslinked polymethyl methacrylate fine particles of Art Pearl F-4P (average particle size: 2 μm) made by Negami Chemical Industrial Co. Ltd. as the organic fine powder in the heat-sealable resin layer (II). The results of evaluating the sample are tabulated in Table 2.

Comparative Example 8

In-mold decorating labels were obtained in the same manner as in Example 9 except for using silicone resin particles of Tospearl 145 (average particle size: 4.5 μm) made by Toshiba Silicone K.K. as the organic fine powder in the heat-sealable resin layer (II). The results of evaluating the sample are tabulated in Table 2.

Example 16

In-mold decorating labels were obtained in the same manner as in Example 9 except for using 18 parts by weight of high pressure process low density polyethylene and 2 parts by weight of Super S heavy calcium carbonate powder (average particle size: 7 μm) made by Maruo Calcium Co., Ltd. as the inorganic fine powder in the heat-sealable resin layer (II). The results of evaluating the sample are tabulated in Table 2.

Example 17

In-mold decorating labels were obtained in the same manner as in Example 9 except for changing the amounts of high pressure process low density polyethylene and Super S as described in Table 2 in the heat-sealable resin layer (II) of Example 16. The results of evaluating the sample are tabulated in Table 2.

Example 18

In-mold decorating labels were obtained in the same manner as in Example 9 except for using Silton JC-70 sodium calcium aluminosilicate fine particles (average particle size. 7 μm) made by Mizusawa Industrial Chemicals, Ltd. as the inorganic fine powder in the heat-sealable resin layer (II) of Example 16. The results of evaluating the sample are tabulated in Table 2.

Example 19

In-mold decorating labels were obtained in the same manner as in Example 9 except for using Silton AMT-100 aluminosilicate fine particles (average particle size: 7 μm) made by Mizusawa Industrial Chemicals, Ltd. as the inorganic fine powder in the heat-sealable resin layer (II) of Example 16. The results of evaluating the sample are tabulated in Table 2.

Comparative Example 9

In-mold decorating labels were obtained in the same manner as in Example 9 except for using Super #1500 heavy calcium carbonate powder (average particle size: 2 μm) made by Maruo Calcium Co., Ltd. as the inorganic fine powder in the heat-sealable resin layer (II) of Example 16. The results of evaluating the sample are tabulated in Table 2.

TABLE 2

| Composition of heat sealable resin layer (II) | Ex. 9 | Ex. 10 | Ex. 11 | Ex. 12 | Ex. 13 | Ex. 14 |
|---|---|---|---|---|---|---|
| Ethylene/hexene-1 copolymer (mp 102° C.) | 80 | 80 | — | 80 | 80 | 80 |
| High pressure process low density polyethylene (mp 110° C.) | 19 | 13 | 29 | 19 | 19 | 19 |
| Ethylene/methyl acrylate copolymer (mp 80° C.) | — | — | 70 | — | — | — |
| Epostar MA1010 (average particle size: 10 μm) | 1 | 7 | 1 | — | — | — |
| Epostar MA1013 (average particle size: 13 μm) | — | — | — | 1 | — | — |
| Art Pearl G400 (average particle size: 10 μm) | — | — | — | — | 1 | — |
| Tospearl 3120 (average particle size: 12 μm) | — | — | — | — | — | 1 |
| MX-1000 (average particle size: 10 μm) | — | — | — | — | — | — |
| Art Pearl F-4P (average particle size: 2 μm) | — | — | — | — | — | — |
| Tospearl 145 (average particle size: 4.5 μm) | — | — | — | — | — | — |
| Super S (average particle size: 7 μm) | — | — | — | — | — | — |
| JC70 (average particle size: 7 μm) | — | — | — | — | — | — |
| AMT-100 (average particle size: 7 μm) | — | — | — | — | — | — |
| Super-1500 (average particle size: 2 μm) | — | — | — | — | — | — |
| Thickness of heat-sealable resin layer (II) (μm) | 5 | 5 | 5 | 5 | 5 | 5 |
| Evaluation: Static friction coefficient | 0.54 | 0.47 | 0.55 | 0.52 | 0.50 | 0.49 |
| Dynamic friction coefficient | 0.36 | 0.32 | 0.40 | 0.35 | 0.33 | 0.32 |
| Feeding properties upon printing | ◯ | ◯ | ◯ | ◯ | ◯ | ◯ |
| Label-inserting suitability | ◯ | ◯ | ◯ | ◯ | ◯ | ◯ |

TABLE 2-continued

| | | | | | | |
|---|---|---|---|---|---|---|
| Generation of blister | none | none | none | none | none | none |
| Adhesion strength with container (g/15 mm) | 740 | 320 | 680 | 750 | 740 | 750 |

| Composition of heat sealable resin layer (II) | Ex. 15 | Ex. 16 | Ex. 17 | Ex. 18 | Ex. 19 | Comp. Ex. 5 |
|---|---|---|---|---|---|---|
| Ethylene/hexene-1 copolymer (mp 102° C.) | 80 | 80 | 80 | 80 | 80 | 80 |
| High pressure process low density polyethylene (mp 110° C.) | 19 | 18 | 13 | 18 | 18 | 19.9 |
| Ethylene/methyl acrylate copolymer (mp 80° C.) | — | — | — | — | — | — |
| Epostar MA1010 (average particle size: 10 μm) | — | — | 7 | — | — | 0.02 |
| Epostar MA1013 (average particle size: 13 μm) | — | — | — | — | — | — |
| Art Pearl G400 (average particle size: 10 μm) | — | — | — | — | — | — |
| Tospearl 3120 (average particle size: 12 μm) | — | — | — | — | — | — |
| MX-1000 (average particle size: 10 μm) | 1 | — | — | — | — | — |
| Art Pearl F-4P (average particle size: 2 μm) | — | — | — | — | — | — |
| Tospearl 145 (average particle size: 4.5 μm) | — | 2 | — | — | — | — |
| Super S (average particle size: 7 μm) | — | — | — | 2 | — | — |
| JC70 (average particle size: 7 μm) | — | — | — | — | 2 | — |
| AMT-100 (average particle size: 7 μm) | — | — | — | — | — | — |
| Super-1500 (average particle size: 2 μm) | — | — | — | — | — | — |
| Oleic acid amide | — | — | — | — | — | — |
| Thickness of heat-sealable resin layer (II) (μm) | 5 | 5 | 5 | 5 | 5 | 5 |
| Evaluation: Static friction coefficient | 0.55 | 0.57 | 0.50 | 0.54 | 0.53 | 0.65 |
| Dynamic friction coefficient | 0.41 | 0.45 | 0.35 | 0.42 | 0.40 | 0.60 |
| Feeding properties upon printing | ○ | ○ | ○ | ○ | ○ | Δ |
| Label-inserting suitability | ○ | ○ | ○ | ○ | ○ | Δ |
| Generation of blister | none | none | none | none | none | None |
| Adhesion strength with container (g/15 mm) | 720 | 650 | 280 | 670 | 680 | 780 |

| Composition of heat sealable resin layer (II) | Comp. Ex. 6 | Comp. Ex. 7 | Comp. Ex. 8 | Comp. Ex. 9 |
|---|---|---|---|---|
| Ethylene/hexene-1 copolymer (mp 102° C.) | 80 | 80 | 80 | 80 |
| High pressure process low density polyethylene (mp 110° C.) | 5 | 19 | 19 | 18 |
| Ethylene/methyl acrylate copolymer (mp 80° C.) | — | — | — | — |
| Epostar MA1010 (average particle size: 10 μm) | 15 | — | — | — |
| Epostar MA1013 (average particle size: 13 μm) | — | — | — | — |
| Art Pearl G400 (average particle size: 10 μm) | — | — | — | — |
| Tospearl 3120 (average particle size: 12 μm) | — | — | — | — |
| MX-1000 (average particle size: 10 μm) | — | — | — | — |
| Art Pearl F-4P (average particle size: 2 μm) | — | 1 | — | — |
| Tospearl 145 (average particle size: 4.5 μm) | — | — | 1 | — |
| Super S (average particle size: 7 μm) | — | — | — | — |
| JC70 (average particle size: 7 μm) | — | — | — | — |
| AMT-100 (average particle size: 7 μm) | — | — | — | — |
| Super-1500 (average particle size: 2 μm) | — | — | — | 2 |
| Thickness of heat-sealable resin layer (II) (μm) | 5 | 5 | 5 | 5 |
| Evaluation: Static friction coefficient | 0.40 | 0.66 | 0.65 | 0.65 |
| Dynamic friction coefficient | 0.27 | 0.61 | 0.59 | 0.61 |
| Feeding properties upon printing | ○ | Δ | Δ | Δ |
| Label-inserting suitability | ○ | Δ | Δ | Δ |
| Generation of blister | yes | none | none | none |
| Adhesion strength with container (g/15 mm) | 130 | 750 | 720 | 650 |

Industrial Applicability

The in-mold decorating label of the present invention has excellent paper-feeding and discharging properties upon printing which facilitates insertion of the label into a metal mold during the in-mold decorating process, generates no blisters, and provides a labeled container wherein the welding strength between the container and the label is large.

What is claimed is:

1. A label, comprising:
    a substrate (I) comprising a thermoplastic resin film comprising a thermoplastic resin; and
    a layer (II) comprising a heat-sealable resin film comprising a polyethylenic resin having a crystallinity of 10 to 60% selected from the group consisting of a low density to medium density of polyethylene having a density of from 0.900 to 0.935 g/cm$^3$; linear polyethylene having a density of 0.880 to 0.940 g/cm$^3$; ethylene/vinyl acetate copolymers; ethylene acrylic acid copolymers; ethylene/alkyl acrylate copolymers in which the alkyl group has 1–8 carbon atoms; ethylene/alkyl methacrylate copolymers in which the alkyl group has 1–8 carbon atoms; metal salts of ethylene/methacrylic acid copolymers; and a linear polyethylene prepared by polymerizing 40 to 98% by weight ethylene and 60 to 2% by weight of a $C_{3-30}$ α-olefin; and 0.05% to 10% by weight of at least one fatty acid amid having a molecular weight of 300 to 1000 and a melting point of 60 to 160° C. and optionally an organic fine powder having an average particle size greater than the thickness of layer (II);
    wherein the layer (II) is disposed on one surface of the layer (I), and has a thickness of at least 1 μm.

2. The label of claim 1, wherein layer (I) is printed on a surface which is opposite to the surface on which the layer (II) is disposed.

3. The label of claim 1, wherein the thermoplastic resin-film is a finely porous stretched resin film, and further comprises an inorganic fine powder.

4. The label of claim 1, wherein the thermoplastic resin is a thermoplastic resin having a melting point which is 15° C. or more higher than the melting point of the polyethylenic resin.

5. The label of claim 1, wherein the substrate layer (I) comprises a biaxially stretched resin film comprising 2 to 30% by weight of an inorganic fine powder, 3 to 20% by weight of a high density polyethylene and 95 to 50% by weight of a propylenic resin.

6. The label of claim 1, wherein the substrate layer (I) further comprises:
- a layer (A) comprising a biaxially stretched resin film comprising 2 to 30% by weight of an inorganic fine powder, 3 to 20% by weight of a high density polyethylene and 95 to 50% by weight of a propylenic resin;
- a layer (B) comprising a first uniazially stretched resin film comprising 35 to 65% by weight of an inorganic fine powder, 0 to 10% by weight of a high density polyethylene and 55 to 35% by weight of a propylenic resin; and
- a layer (C) comprising a second uniaxially stretched resin film comprising 35 to 65% by weight of an inorganic fine powder, 0 to 10% by weight of a high density-polyethylene and 55 to 35% by weight of a propylenic resin;
- wherein layer (B) is disposed on one side of Layer (A), layer (C) is disposed on the opposite side of layer (A), and layer (II) is disposed on the side of layer (C) opposite layer (A), whereby the layers have the order B/A/C/II.

7. The label of claim 1, wherein layer (II) comprises 0.1 to 5% by weight, based on the polyethylenic resin, of a fatty acid amide.

8. The label of claim 1, wherein layer (II) comprises 0.05 to 10% by weight, based on the polyethylenic resin, of an organic or inorganic powder having an average particle size larger than the thickness of layer (II).

9. The label of claim 1, wherein said polyethylenic resin has a melting point of 80 to 130° C.

10. The label of claim 1, wherein the thickness of layer (II) is 1–10 $\mu$m.

11. The label of claim 1, wherein the particle size of the fine powder if 20 $\mu$m or less.

12. The label of claim 1, wherein the thermoplastic resin film comprises a thermoplastic resin selected from the group consisting of high density polyethylene, medium density polyethylene, polypropylene, polymethyl-1-pentene, ethylene/cyclic olefin copolymers, polyamide resins, nylon-6, nylon-6,6, nylon-6,10, nylon-6,12, nylon-6,T, thermoplastic polyester resins, polyethylene terephthalate and copolymers thereof, polyethylene naphthalate, aliphatic polyesters, polycarbonates, syndiotactic polystyrene, and polyphenylene sulfide.

13. The label of claim 1, wherein the polyethylenic resin is a Zn, Al, Li, K, or Na salt of an ethylene/methacrylic acid copolymers.

14. The label of claim 1, wherein the powder is an organic fine powder selected from the group consisting of polymethyl methacrylate fine particles, crosslinked polymethyl methacrylate fine particles, crosslinked polystyrene fine particles, silicone resin fine particles and polytetrafluoroethylene fine particles.

15. The label of claim 1, wherein the powder is an organic fine powder selected from the group consisting of heavy calcium carbonate, light calcium carbonate, clay, aluminosilicate, sodium calcium aluminosilicate, silica, soda-lime glass, talc, titanium oxide and barium sulfate.

16. The label of claim 1, wherein the fatty acid amide is selected from the group consisting of behenic acid amide, methylenebisstearic acid amide, ethylenebis lauric acid amide, ethylenebisstearic acid amide, ethylenebisoleic acid amide, ethylenebisercinic acid amide, N-stearylercamide, and N-stearyloleylamide.

17. A plastic container comprising the label of claim 1.

* * * * *